United States Patent [19]
Barker et al.

[11] Patent Number: 5,432,910
[45] Date of Patent: Jul. 11, 1995

[54] COUPLING APPARATUS AND METHOD FOR INCREASING THE CONNECTION CAPABILITY OF A COMMUNICATION SYSTEM

[75] Inventors: Kenneth J. Barker, Cary; George M. Calhoun, Raleigh, both of N.C.; Jean Calvignac, La Gaude, France; Rene Castel, Tourrettes-Sur-Loup, France; Jean C. Dispensa, Saint-Jeannet, France; Yves Huchet, Nice, France; Edward S. Suffern, Chapel Hill, N.C.; Ruggero Ulivastro, Nice, France

[73] Assignee: International Business Machines Corporation, Armonk, N.Y.

[21] Appl. No.: 909,884

[22] Filed: Jul. 7, 1992

[30] Foreign Application Priority Data
Sep. 30, 1991 [FR] France .................. 91 480154

[51] Int. Cl.6 ............................ G06F 13/28
[52] U.S. Cl. ................... 395/275; 395/325; 395/800; 370/79
[58] Field of Search .......... 395/800, 325, 275, 200; 364/251.5; 370/79

[56] References Cited

U.S. PATENT DOCUMENTS

| | | | |
|---|---|---|---|
| 4,093,981 | 6/1978 | McAllister et al. | 395/575 |
| 4,336,588 | 6/1982 | Vernon et al. | 395/325 |
| 4,447,871 | 5/1984 | Terada et al. | 395/200 |
| 4,593,352 | 6/1986 | Castel et al. | 395/275 |
| 4,783,730 | 11/1988 | Fischer | 395/275 |
| 5,101,478 | 3/1992 | Fu et al. | 395/275 |
| 5,197,065 | 3/1993 | Calvignal et al. | 370/79 |
| 5,202,921 | 4/1993 | Herzberg et al. | 380/23 |
| 5,317,692 | 5/1994 | Ashton et al. | 395/200 |

Primary Examiner—Alyssa H. Bowler
Assistant Examiner—John A. Follansbee
Attorney, Agent, or Firm—John J. Timar

[57] ABSTRACT

The connection capability of a communication controller is extended. The communication controller includes a central control unit CCU, running a network control program NCP stored in a memory having a direct memory access facility through a DMA bus. The input/output bus of the communication controller and DMA bus are connected to line adapters, and channel adapters and a controller extension through a coupler which allows additional adapters to be connected to the controller. At initialization, a table is built into a coupler memory, which is then used in steady state mode for controlling the transmission of the messages to the additional users and the reception of the messages from the additional users, by improving the buffer unchaining and chaining processes into the NCP memory.

5 Claims, 12 Drawing Sheets

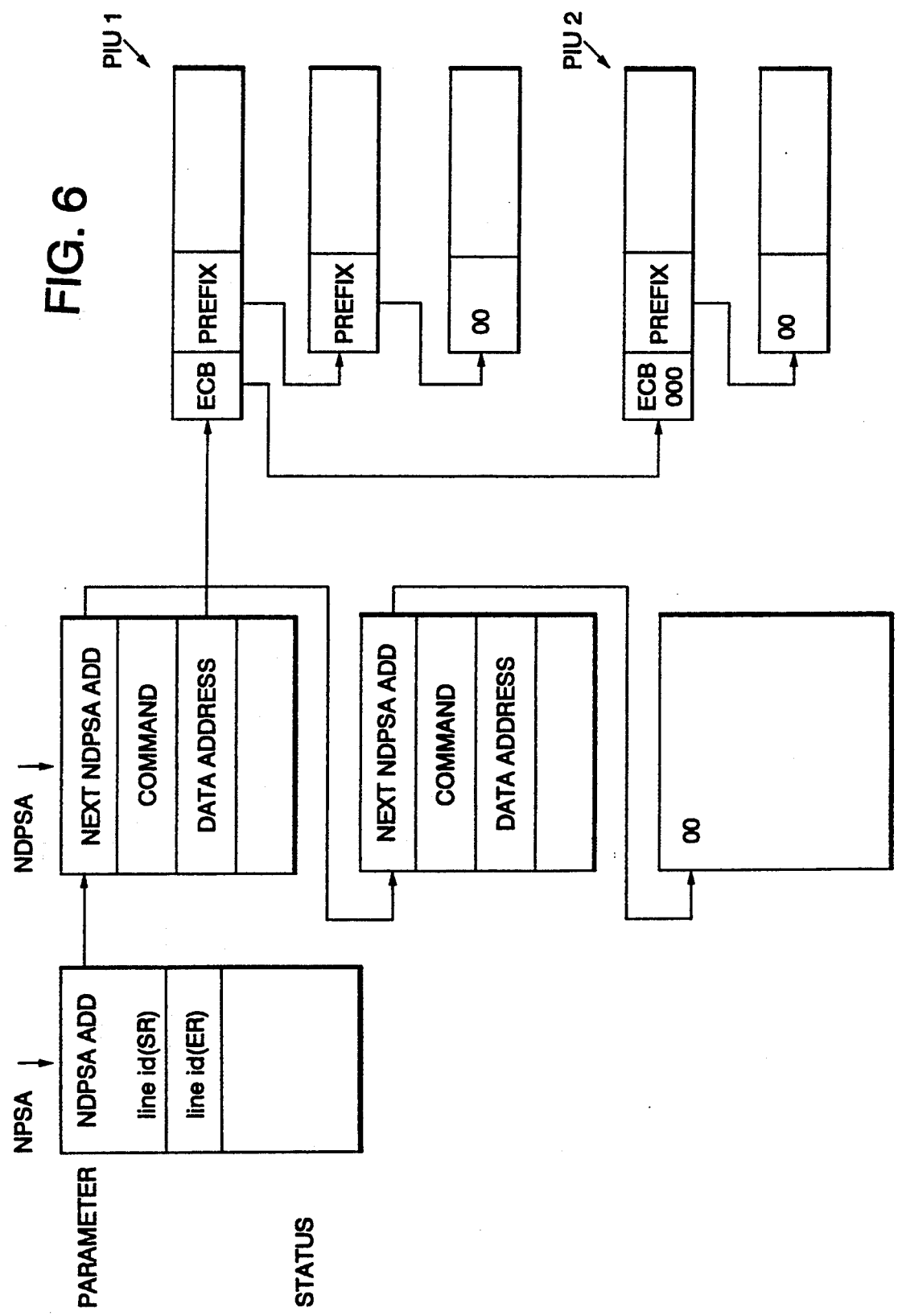

|     | 1 BYTE | 1 BYTE | 1 BYTE | 1 BYTE |
|-----|--------|--------|--------|--------|
| 0   |        | CHAIN POINTER TO NEXT NDPSA=00 | | |
| 4   | COMMAND | QUALIFIER | FLAGS | |
| 8   | FIELD 1 | LOCAL RESOURCE ID (LRID) | | |
| 12  | FIELD 2 | FIRST DATA POINTER | | |
| 16  | FIELD 3 | SECOND DATA POINTER | | |
| 20  | FIELD 4 | FIELD 5 | FIELD 6 | FIELD 7 |
| 24  | SEQUENCE COUNTER | | | |

FIG. 7

|     |        |        |        |        |
|-----|--------|--------|--------|--------|
| 0   |        | CHAIN POINTER TO NEXT NDPSA=00 | | |
| 4   |        | INIT X'10' | FLAGS | |
| 8   | RECEIVE X'0E' | LRID = 0 | | |
| 12  | NCP BUFFER SIZE | 0 | | |
| 16  | LDPSA COUNT | POINTER TO THE FIRST BUFFER IN THE RECEIVE LIST | | |
| 20  | 0 | POINTER TO THE FIRST LDPSA | | |
| 24  | SEQUENCE COUNTER | | | |

FIG. 8

|     | 1 BYTE | 1 BYTE | 1 BYTE | 1 BYTE |
|-----|--------|--------|--------|--------|
| 0   |        | CHAIN POINTER TO NEXT NDPSA | | |
| 4   | PIU='0C' | QUAL=01 | FLAGS | |
| 8   | 00 | LOCAL RESOURCE ID (LRID)=ADAPTERID | | |
| 12  | 00 | POINTER TO THE PIU | | |
| 16  | 00 | 00 | 00 | 00 |
| 20  | 00 | 00 | 00 | 00 |
| 24  | SEQUENCE COUNTER | | | |

| | 1 BYTE | 1 BYTE | 1 BYTE | 1 BYTE | |
|---|---|---|---|---|---|
| 0 | | CHAIN POINTER TO NEXT LDPSA | | | |
| 4 | COMMAND | QUALIFIER | FLAGS | | LDPSA |
| 8 | Bfrs USED | LOCAL RESOURCE Id (LRID) | | | |
| 12 | FIELD 1 | FIRST DATA POINTER | | | GENERAL LAYOUT. |
| 16 | FIELD 2 | SECOND DATA POINTER | | | |
| 20 | FIELD 3 | FIELD 4 | FIELD 5 | FIELD 6 | |
| 24 | SEQUENCE COUNTER | | | | |

FIG. 14

PIU-LDPSA

| | 1 BYTE | 1 BYTE | 1 BYTE | 1 BYTE | |
|---|---|---|---|---|---|
| 0 | | CHAIN POINTER TO NEXT LDPSA | | | |
| 4 | | | | | |
| 8 | ►Bfrs USED | LOCAL RESOURCE Id (LRID) | | | FIELDS MARKED WITH → ARE BUILT BY THE COUPLER PICOCODE |
| 12 | Bfr OFFSET | ►POINTER TO FIRST NCP BUFFER OF DATA | | | |
| 16 | ►RES BYTE Ct | ►POINTER TO LAST NCP BUFFER OF DATA | | | |
| 20 | ACK COUNT | | TOTAL DATA LENGTH | | |
| 24 | SEQUENCE COUNTER | | | | |

Bfr OFFSET-OFFSET TO DATA IN FIRST NCP BUFFER OF DATA
SET BY ADAPTER.
RES BYTE ct-RESIDUAL BYTE COUNT IN THE LAST NCP BUFFER
MAKING UP THIS DATA.

COUPLING APPARATUS AND METHOD FOR INCREASING THE CONNECTION CAPABILITY OF A COMMUNICATION SYSTEM

DESCRIPTION OF THE INVENTION

The subject invention relates to a method and an apparatus implemented in a communication system for increasing the number of lines which can be connected to the communication system.

BACKGROUND ART

A communication system such as the IBM 3725 or 3745 Communication Controller, comprises a central control unit CCU running a Network Control Program NCP stored in a memory, an I/O bus for connecting the central control unit CCU to end users through line adapters on the one hand, and to central processing units CPU through channel adapters on the other hand. U.S. Pat. No. 4,593,352 describes this system and the method for exchanging information and data on the I/O bus.

A communication controller such as the IBM 3745 is provided with a direct memory access capability, which allows attachment of high speed communication links T1 as described in EP-A-0 000244544.

Now, using switching systems such as described in EP-A-0 000387464, it will be possible to interconnect communication devices without the need of a central control unit.

In such an environment, it will be of interest to have one communication device made of a communication controller of the IBM 3745 type, so that the connectivity of this controller can be extended in a significant way.

However, because the Network Control Program is designed to be able to manage a maximum number of line adapters, such a connection is not possible.

OBJECT OF INVENTION

Consequently, an object of the present invention is to provide a method and an apparatus which makes it possible to extend the connection capability of a communication system, so that this communication system can control the communication from/to a higher number of end users.

BRIEF SUMMARY OF THE INVENTION

The method, according to the present invention, allows the capability of user connections to a communication system to be extended. The communication system is of the type comprising a central control unit running a network control program NCP stored in a NCP memory, provided with a direct memory access DMA facility through a direct memory access bus, and an input/output I/O bus by which the central control unit exchanges information with the users connected thereto through input/output I/O operations (IOH) controlled by the network control program. The method is implemented by the network control program and a coupling means having a unique address, connected to the I/O bus and DMA bus and to additional users. It is characterized in that it comprises the steps of:

for each additional user, assigning in the NCP memory a first NCP area (NPSA) comprising at least a pointer field to a second NCP area (NDPSA), which comprises at least a first pointer field to a next second NCP area, which can be written by the network control program to a value which indicates whether a next second NCP area is chained thereto or not, and if yes, the address of the chained second NCP area and a second pointer field, which is written by the network control program to indicate the starting address of a buffer chain into which the messages to be transmitted to the corresponding additional user, if any, are stored, issuing initialization I/O operations (SET LNVT, SLI) on the I/O bus, specifying the coupling means address, user identification, and an indication of the first NCP area address, for providing the address of the first NCP area assigned to each additional user to the coupling means, receiving said initialization I/O operations by the coupling means, and building in the coupling means a table comprising the correspondence between a user and the assigned NCP area address, issuing normal mode I/O operations on the I/O bus, for transmitting messages to the additional users, said operations specifying the coupling means address and the user identifications, receiving said normal mode I/O operations by the coupling means, and reading the corresponding first NCP area addresses which are used by the coupling means for initiating a sequence of DMA accesses to the NCP memory (12) for reading the contents of the NCP area to get the addresses of the second NCP areas, and of the messages chained thereto, if any, and transmitting said second NCP areas and chained messages to the users.

The method also comprises the following steps to control the data flow from the users to the network control program:

for each additional user, assigning in the NCP memory, a first user area (LPSA) the address of which is provided to the coupling means through the initialization I/O operations and written into the correspondence table, for each additional user, providing in the NCP memory a number of second user areas (LDPSA), which are chained through a pointer field written by the network control program to a value indicative of the address of the next second user area, or to a value indicating that the next second user area is the last area of the second user area chain, for each user, providing in the NCP memory a chain of buffers, with each buffer containing a pointer address field next buffer of the chain, writing by the network control program upon issuing the I/O initialization operations, a specific first NCP area for each user, comprising the number of second user areas (LDPSA) assigned to the user, a pointer field set to the starting address value of the second user area chain and a pointer field set to the starting address value of the buffer chain assigned to the user, initiating a read direct memory access by the coupler to the address of the first NCP area computed by the coupling means upon receiving the initialization I/O operations for getting the contents to the second user area fields which are written into the correspondence table.

The messages are received from the additional users by the implementation of the following steps:

receiving by the coupling means the messages arranged in second user areas (LDPSA) and user data from each additional user, reading the starting address value of the second user area chain and the starting address of the buffer chain from the correspondence table, initiating read direct memory accesses by the coupling means to get the addresses of the next buffer address and next second user area, initiating write direct memory accesses by the coupling means for writing data into the buffer chain at the successive addresses read from the correspondence table and read from the NCP memory by the read direct memory accesses, initiating write direct memory accesses by the coupling means at the successive addresses of the second user areas read from the correspondence table, and read from the NCP memory by the read direct memory accesses for updating the addressed second user areas in the NCP memory with the addresses of the buffers chained thereto.

BRIEF DESCRIPTION OF THE DRAWINGS

FIG. 6 represents the buffer chaining in the network control program memory.

FIGS. 7 represents the format of the NCP Dynamic Parameter Status Area NDPSA.

FIG. 8 represents the contents of the Receive Initial NDPSA.

FIG. 9 represents the contents of the PIU- NDPSA's.

FIG. 13 represents the format of the Logic Interface Module LIM Dynamic Parameter Status area LDPSA.

FIG. 14 represents the contents of the PIU-LDPSA.

DETAILED DESCRIPTION OF THE PREFERRED EMBODIMENT OF THE INVENTION

Figure 1:
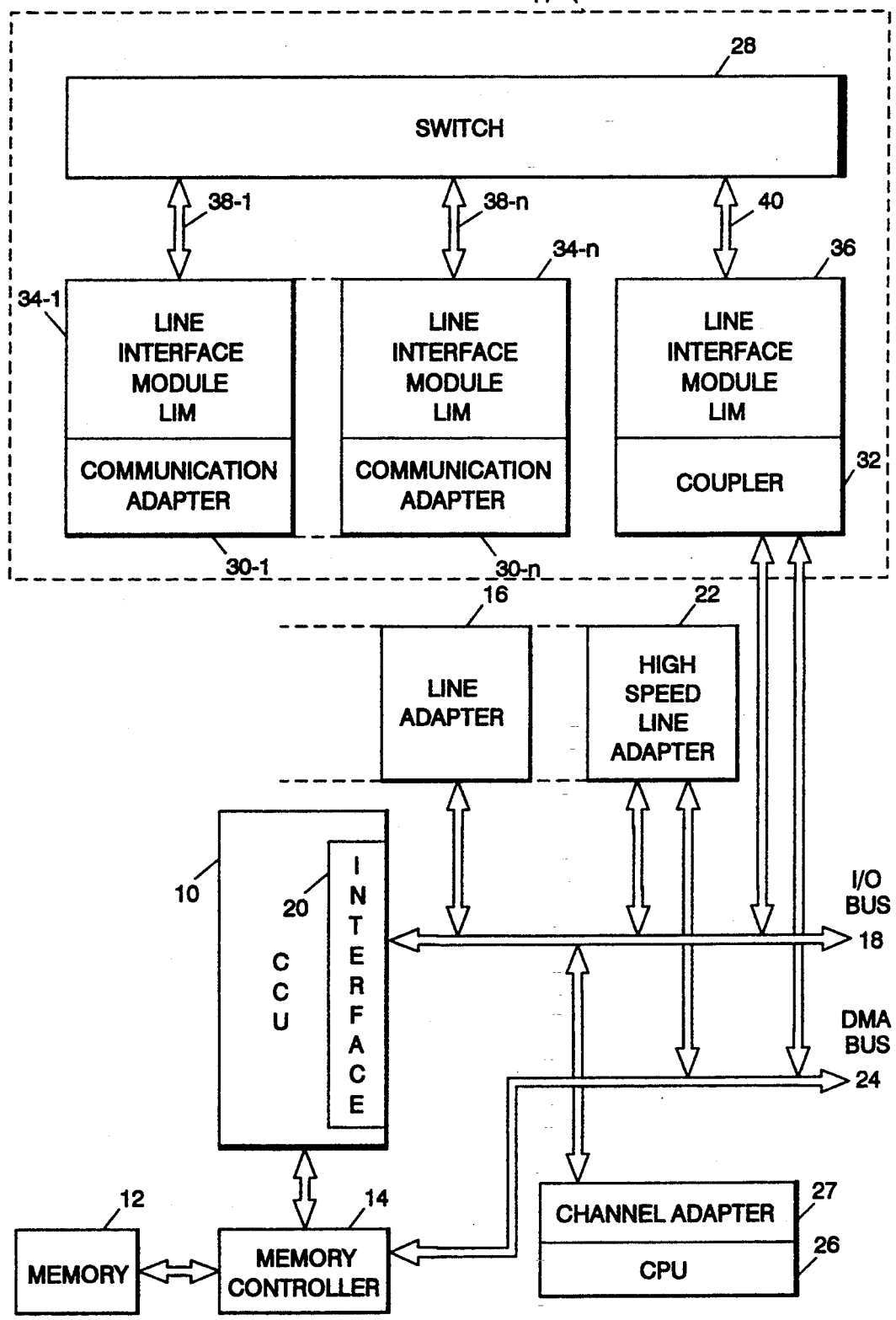
FIG. 1 represents a block diagram of a communication controller and its attachment to a controller extension through a coupler according to the present invention.

As shown in FIG. 1, a communication controller such as the IBM Model 3745, comprises a central control unit CCU 10 which runs a Network Control Program NCP stored in a memory 12. The accesses to the memory 12 are managed by a memory controller 14.

Low speed adapters, such as line adapter 16, are connected to the central control unit 10 through an input-/output bus 18 and an I/O interface 20, which manages the exchange of information on the I/O bus as described in U.S. Pat. No. 4,593,352.

High speed adapters 22 are connected to the CCU 10 through the I/O bus, and have direct memory access to the memory through a DMA bus 24 connected to the memory controller 14.

Central processing units such as 26 are connected to the I/O bus through channel adapters 27.

One of the functions of the Network Control Program is to receive and transmit the messages which comprises either control messages or data messages, called Physical Information Unit PIU, from/to end users attached to the adapters and CPU's by enqueuing and dequeuing these messages to/from buffer chains built into the memory 12 under control of the program.

As described in U.S. Pat. No. 4,593,352, at initialization, the Network Control Program builds a line vector table LNVT which comprises a memory location assigned to each communication line, which is connected to the line adapters 16, 22 which stores the address of a parameter/status area PSA reserved in the memory 14 for storing parameter, status and information corresponding to the transmit and receive directions of the corresponding communication line.

The parameter/status areas are used for command and status transfers between the CCU and the microprocessors in the line adapters for controlling the message exchanges as fully described in U.S. Pat. No. 4,593,352.

According to the present invention, additional communication adapters 30-1 to 30-n are connectable to the I/O bus 18 and DMA bus 24 by means of a coupler 32.

The communication adapters 30-1 to 30-n and coupler 32 can be interconnected through an interconnection mechanism 28. A specific mechanism able to perform this interconnection is described in EP-A-0 000387464.

The communication adapters receive/transmit messages from/to the memory 12 so that they can be processed by the CCU 10.

Line interface modules 34-1 to 34-n and 36 and busses 38-1 to 38-n and 40 are the interfaces between the communication adapters 30-1 to 30-n and the coupler 32 and the switch 28.

Their main functions consist in receiving the messages from the adapters or coupler, enqueuing the messages in output queues toward the target communication adapter, and receiving the messages switched by the switch 28 so that they can be transmitted by the communication adapters to the users connected thereto.

A mechanism for performing these functions is described in EP-A-0 000365761.

Figure 2:
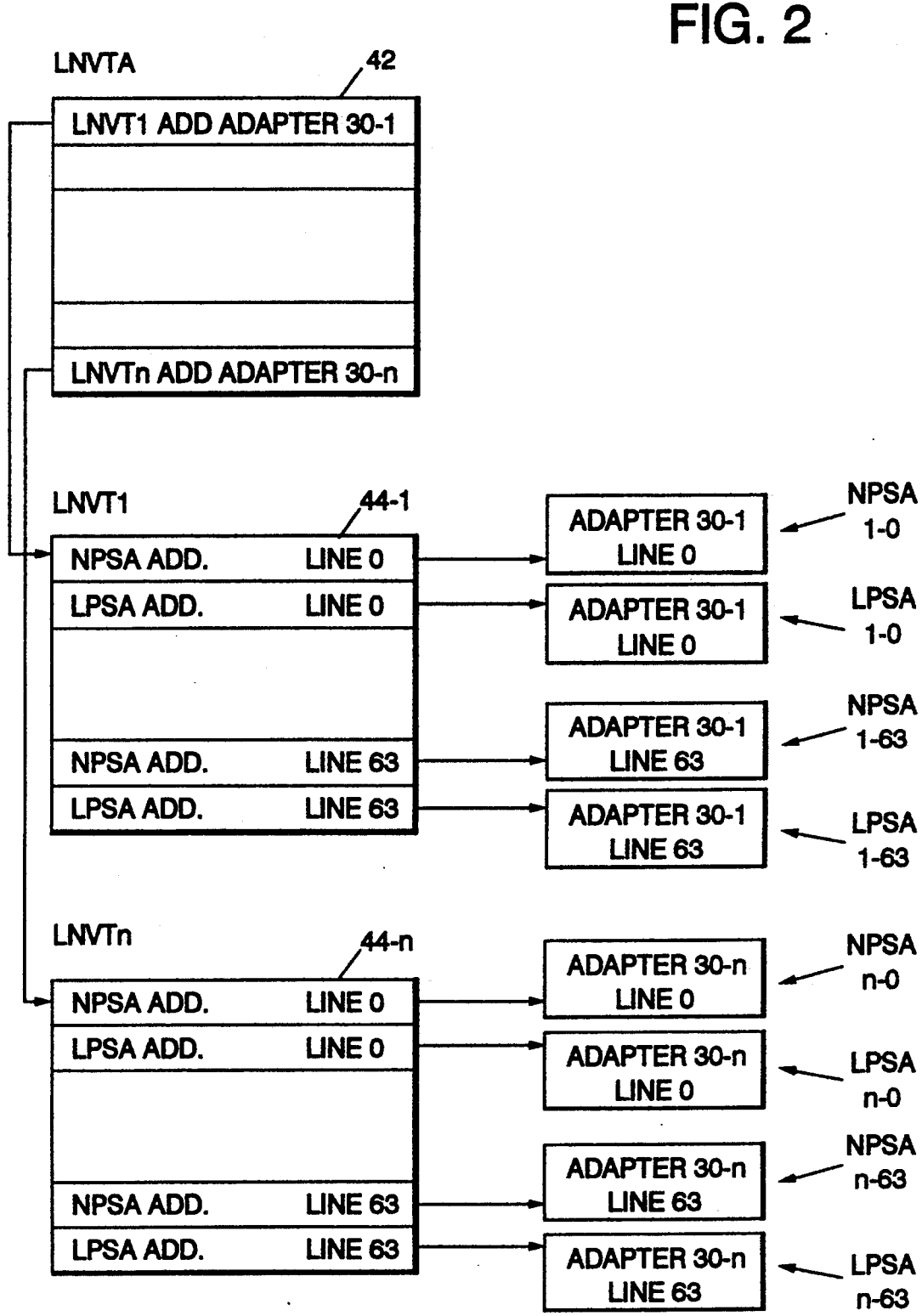
FIG. 2 represents the memory arrangement of the network control program memory 12.

As will be described later on, NCP structures commands and data into a series of NCP-Parameter Status Areas NPSA, or LIM-Parameter Status Areas LPSA chained to NCP-DPSA or LIM-DPSA chained to PIU's. The coupler interfaces to the NCP structure by accessing the NCP memory, concatenating and building the messages for the target LIM in the transmit direction, and by arranging the messages from the LIM's in the NCP memory in the receive direction. To manage the exchange of messages with the additional adapters 30-1 to 30-n, the network control program NCP establishes tables in memory 12 at the system initialization, as shown in FIG. 2. A first table 42 called line vector table, LNVT A comprises one memory location for each adapter 30-1 to 30-n, the contents of which points to the starting addresses of n line vector tables LNVT-1 to LNVT-n, referenced 44-1 to 44-n.

For example, the contents of the first location of table LNVT A, i.e. "LNVT 1 ADD. Adapter 30-1" points to the first location of table LNVT-1, 44-1.

Each table LNVT-1 to LNVT-n comprises two locations per line which can be attached to a communication adapter. In a preferred embodiment of the invention, there can be up to 64 lines per adapter.

At initialization, NCP stores in each location of tables LNVT-1 to LNVT-n, address pointers to NPSA and LPSA areas as shown in FIG. 2. For example, in table LNVT-1, the first location contains a pointer "NPSA Add. Line 0" which is the address of a NPSA area for line 0 of adapter 30-1. The second location contains a pointer "LPSA Add. Line 0" which is the address of a LPSA area for line 0 of adapter 30-1. NPSA stands for NCP-Parameter Status Area and LPSA stands for LIM-Parameter Status Area. The NPSA's are the parameter and status areas used for controlling the transfer of messages from NCP to the line interface modules. The LPSA's are the parameter and status areas used for controlling the transfer of messages from the LIM's to NCP, as will be explained later on.

According to the invention, the messages to be transmitted from NCP to the LIM's are chained in NCP memory 12 to the NPSA. They are read by the coupler from this memory and transferred to the LIM's by the line interface module 36 and the switch 28.

The messages received by NCP from the LIM's are received by the line interface module 36 and transferred by the coupler into the NCP memory as will be described later on.

Figure 3:
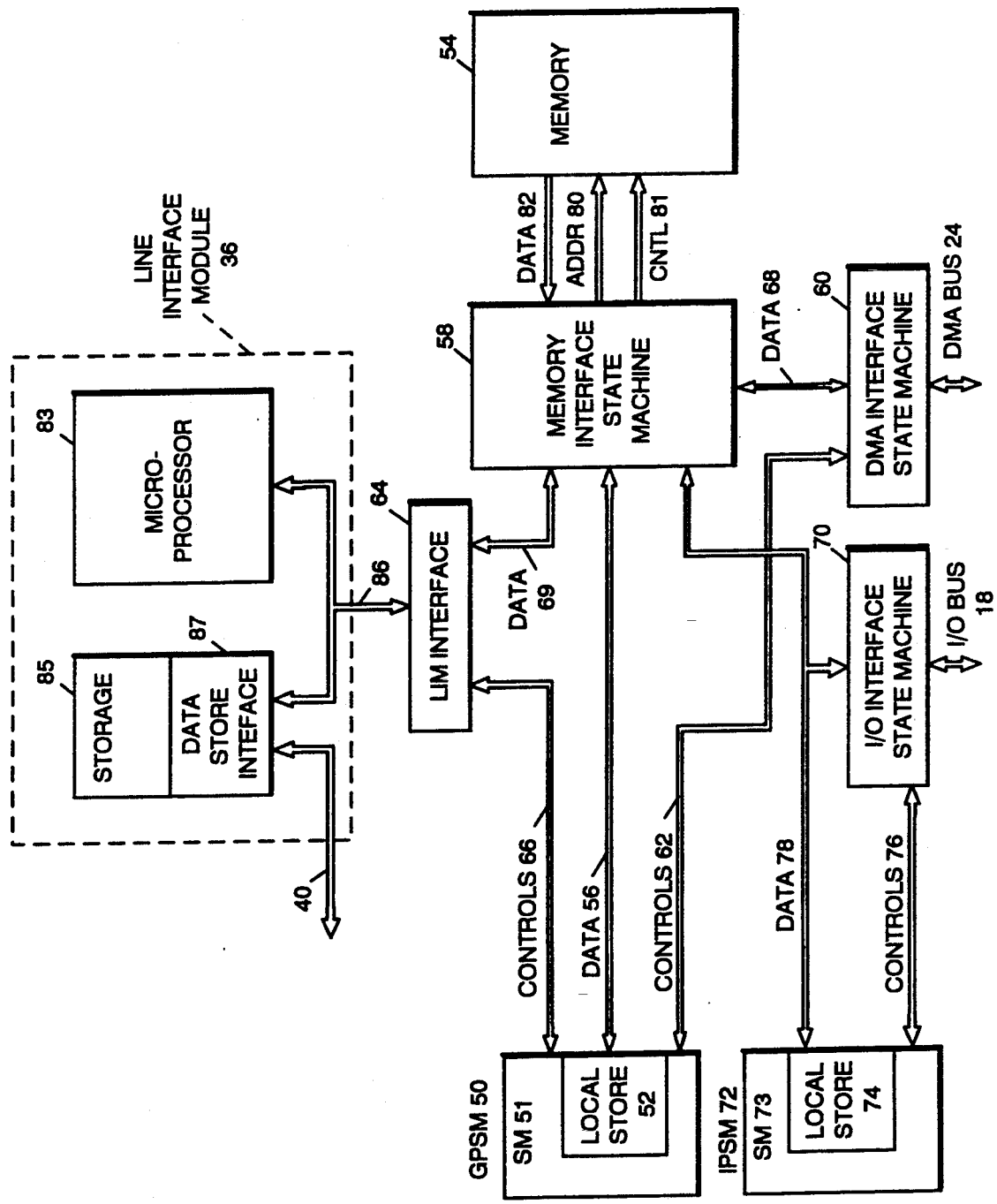
FIG. 3 represents the coupler data flow.

Before explaining these processes in detail, the block diagram of the coupler 32 shown in FIG. 3 will be described. In the coupler, embedded hardware picoprocessors perform the hardware chaining and unchaining of commands and format the messages for the target LIM's and vice versa. The picoprocessors are capable of multiplexing up to 1024 lines at once.

The coupler controls the data flow between the communication controller interface 20 and DMA bus 24 and the controller extension 41 comprising the switch 28, the adapters 30-1 to 30-n, the coupler 32 and the corresponding line interface modules 34-1 to 34-n and 36.

Once the data flow has been established, the picoprocessors are free to perform all the buffer chaining-/unchaining calculations and format the messages.

A line parameter table implemented in a memory 54 allows the picoprocessors to service the 1024 lines at one time.

The coupler comprises a general picocoded state machine GPSM 50, which consists of a state processor or state machine SM 51 comprising logic circuitry with associated registers and counters and a local store 52. This GPSM machine 50 interfaces with the memory 54 through data bus 56 and memory interface state machine 58.

The operations are executed by the state processor SM 51, which controls a DMA interface state machine 60 through commands generated on control bus 62. The DMA interface state machine 60 controls the DMA accesses through DMA bus 24.

GPSM machine 50 also controls a LIM interface 64 through commands generated on control bus 66.

In response to commands on control busses 62 and 66, data are transferred between DMA state machine 60 and memory interface state machine 58 through bus 68 and between LIM interface 64 and memory interface state machine 58 through bus 69. Through a sequence of operations performed under control of the GPSM machine 50, the traffic is maintained between the line interface modules LIM 34-1 to 34-n and the communication controller.

The input/output bus 18 is attached to the coupler through an input/output interface state machine 70.

An input/output picocoded state machine IPSM 72, which consists of a state processor or state machine SM 73 comprises logic circuitry, counters and registers and of a local store 74 which interfaces with memory 54.

Input/output instructions issued by NCP on bus 18 are processed by the IPSM 72, which receives from and issues commands to I/O interface state machine, on control bus 76 and controls the transfer of data on bus 78 between the I/O interface state machine 70, the local store 74 and memory interface state machine 58.

Thus, the command and interrupt mechanisms between NCP and the LIM's are maintained.

The local stores 52 and 74 comprise a small amount of random access memory used as a scratch pad memories by the two state machines 50 and 72.

Parameters are moved into the local stores 52, 74 from the RAM 54. Some parameters are used to create the commands on busses 62, 66 and 76.

Status information from the DMA and LIM interfaces 60 and 64 can also be placed in local stores and analyzed by the state machines 50 and 72.

The DMA interface state machine 60 is a hard wired logic that maintains the interface with the controller DMA bus 24. This logic is dependent on the GPSM 50 to initialize the control parameters required for data transfers between the controller memory 12 and the coupler memory 54. Control fields are built in the coupler memory 54 before issuing a start command on bus 62 for the DMA interface state machine 60. The GPSM 50 polls for completion of the transfer and then collects status in its local store 52 to determine the success of the transfer.

Input/output interface state machine 70 is a hardwired logic that maintains the interface to the communication controller input/output bus 18. It provides the IPSM 72 with the input/output instructions that are issued by the network control program. Input IOH instructions from the communication controller are answered by this hardware. If data is to be provided to the communication controller across the input/output interface 70, the IPSM 72 will provide that data to the interface 70 through bus 78. IOH instructions and interrupts to the controller are handled through this interface 70.

The LIM interface 64 is a hardwired machine that maintains the interface to the LIM 36. This machine is dependent upon the GPSM 50 to initialize the control parameters required to perform transfers. Destination and source address, data count, read or write commands are provided by the GPSM 50. Control fields are built in the memory 54 by the GPSM 50 before issuing a start command for the LIM interface 64. The GPSM polls for completion of transfer and then collects status in local store to determine the success of the transfer.

The memory 54 is used to hold user data, configuration tables about the controller extension 41, address tables for the possible ports of the controller extension 41. Memory incoming data are provided on bus 80 from local stores 52 or 74, DMA interface state machine 60 or LIM interface 64. Memory outgoing data on bus 82 are provided to local stores 52 or 74, DMA interface state machine 60 or LIM interface 64. Address and control for memory 54 are provided on bus 81 (not identified in FIG. 3).

Memory interface machine 58 maintains, arbitrates and controls the traffic in and out of memory 54 from all its possible sources and destinations. This arbitration can be done through any conventional handshake interface between all users and the memory interface state machine 58. The specific LIM interface module 36 comprises a microprocessor 83 running a control code stored in storage 85 and attached to the LIM interface 64 through bus 86.

Data store interface 87 controls the chaining and enqueuing in storage 85 of the messages or PIU's coming from busses 40 and 86 and the unchaining and dequeuing from storage 85 of the messages or PIU's to be sent on busses 40 and 86 in order to control the transmit traffic from NCP to LIM's and the receive traffic from the LIM's to NCP.

For NCP to communicate with a target LIM, it must build a series of entities in the communication controller memory 12. First an NPSA controls the target communication line and is the mechanism to exchange the line status after each series of commands are issued by NCP. Second this NPSA points to an NCP-Dynamic Parameter Status Area NDPSA which contains line messages and points to data. The third entity is a PIU which contains the actual data for the target LIM.

For the LIM to communicate with NCP, NCP reserves areas in memory 12, namely a chain of PIU buffers, a series of LIM-Dynamic Parameter Status Areas LDPSA and a Line Parameter Status area LPSA. The handling of NPSA, LPSA, NDPSA, LDPSA and data is done through the coupler 32. Once it receives an input/output command IOH from bus 18, it accesses the NPSA, NDPSA and PIU and forms a message that can be handled by the target LIM. In the reverse direction, the coupler receives a message from a target LIM and formats it into the correct sequence understood by NCP.

According to the present invention, the coupler 32 has two modes of operation, namely; the non-steady state mode of operation and the steady state mode of operation.

Figure 4:
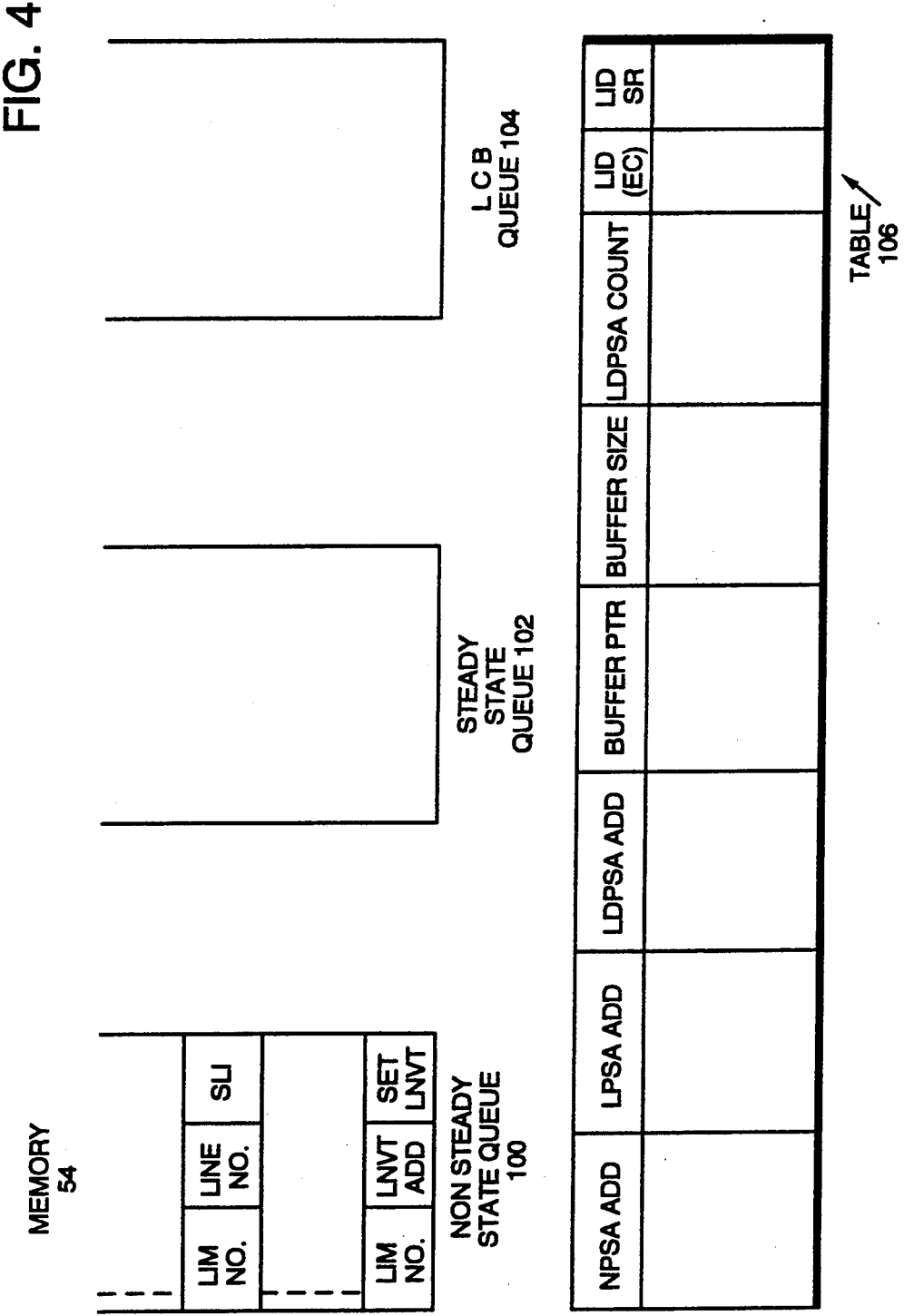
FIG. 4 represents the table and queue arrangement in the coupler memory.

The non-steady state mode of operation is the initialization mode allowing a correspondence table 106 (shown in FIG. 4) to be built into memory 54, with the required information for controlling the steady state mode of operation, which is the normal mode of operation allowing the exchange of messages or PIU's between the communication controller and the LIM's. As shown in FIG. 4, a first queue 100 called the non-steady state queue, a second queue 102 called the steady state queue, and a third queue 104 called the line control block queue are available in memory 54. These queues are managed by memory interface machine 58 and their contents are provided to one of the state machines of the coupler in order to control the operation of the coupler, as will be described later on.

The first queue 100 is used in non-steady state mode of operation for establishing the table 106 comprising at least the correspondence between the LIM No., line No. and NPSA address, LPSA address, LDPSA address, buffer address for each line of the controller extension.

In non-steady state mode, NCP issues for each LIM a first set of output IOH operations called "SET LNVT", and for each line of each LIM a second set of output IOH operations called "START LINE INITIAL-SLI".

As described in above referenced U.S. Pat. No. 4,593,352, the I/O bus 18 comprises control lines and data lines B0 and B1.

An IOH operation results in the provision of information on data lines B0 and B1 under control of address tag TA and data tag TD on control lines of the bus.

The information provided on data lines B0 and B1 for the SET LNVT operations relative to each LIM are:

TA data 11 LIM No   SET LNVT
   Coupler Add   operation code
TD data   LNVT Address of LIM The "11" in the TA data indicates that the IOH operation is for the coupler. The information provided on data lines B0 and B1 for the START LINE INITIAL operations relative to each line are:

TA data 11 LIM No   SLI
   Coupler Add   operation code
TD data   COMMAND=ER   Line No The "11" in the TA data indicates that the IOH operation is for the coupler and ER is an Execute Request Command the execution of which ends with an Execute Clear command IOH, as will be described later on.

The line number is the relative number of the line (0 to 63) of the LIM.

Figure 5:
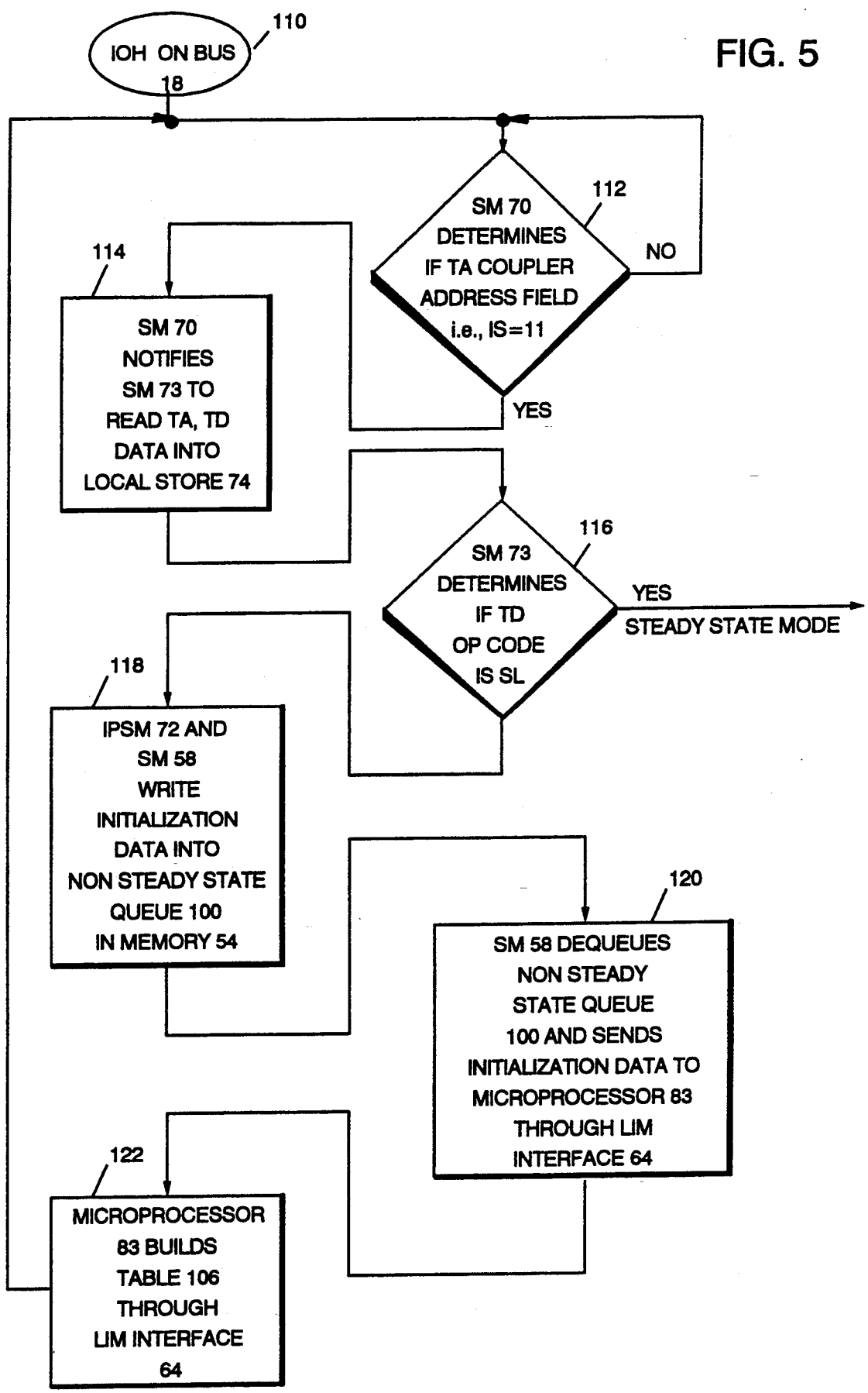
FIG. 5 represents the initialization process implemented in the coupler for building the correspondence table 106 in the coupler memory.

The initialization operations are performed under control of the I/O interface state machine 70 and 72 as shown in FIG. 5.

State machine 70 is responsive to the I/O bus status, and when it detects that an IOH operation is present on bus 18, as shown by state 110, it tests at step 112 whether the coupler address bits on data lines are set to 11.

If yes, at step 114 state machine 70 notifies the state machine 73 to read the IOH data (TA and TD data) and store them into local store 74 (step 116), it decodes the OP code field. At step 116 state machine 73 determine if TD OPERATION field is SL. If yes, the steady state mode is entered. If no, state machines 72 and 58 writes the initialization data comprising the LIM No, OP code and LINE No into non steady state queue 100 in memory 54, as shown by step 118.

Upon detection by memory interface state machine 58 that the non-steady state queue is not empty, memory interface machine 58 starts the dequeuing of the initialization data and their transmission to microprocessor 83 through LIM interface 64, step 120. The microprocessor code is in charge of computing the NPSA and LPSA addresses for each line of each LIM as a function of the initialization data received from the coupler and building the table 106 (step 122).

These addresses depend upon the LNVT addresses of the LIM and upon the Line No.

The computed NPSA and LPSA addresses are returned to coupler 32 through LIM interface 64 and are written into table 106. The NPSA address is also provided into local store 52 of GPSM 50, in order for GPSM to initiate a DMA request to read the NPSA. The NPSA is transferred into memory 54 and then transferred to local store 52. The NPSA contains a pointer to a NDPSA area, a first line identification ER field and a second line identification SR field. These fields store the addresses in the LNVT table of the areas containing the NPSA and LPSA addresses of the line, respectively.

GPSM 50 initiates a DMA request to read the NDPSA which is transferred into memory 54 and then to local store 52. The LDPSA address, the pointer to the first buffer in the receive list, the NCP buffer size contained in the NDPSA-Receive Initial shown in FIG. 8 is written into table 106.

In addition, the NDPSA is processed as in steady state mode as will be explained later on.

When the initialization process is completed, i.e. when table 106 has been successfully loaded, microprocessor 83 sends an initialization completion status via interface 64 and 58 that is processed by I/O interface state machine 70. In response thereto, state machine 70 raises an interrupt request to communication controller in order for the NCP to branch to the steady state mode of operation.

FIG. 6 shows how the messages and PIU's are chained to a NPSA area in the NCP memory.

The NPSA stores parameter and status information. One of the parameters is a pointer to a NCP-Dynamic Status Area NDPSA. The general layout of a NDPSA is shown in FIG. 7. It comprises a number of words of four bytes, into which NCP writes information which controls the operations executed by the coupler state machines and also used for sending initialization information to the LIM's.

For the present time, suffice it to say that the NDPSA comprises a Next NDPSA address field, command fields and a data address field.

NCP stores in the next NDPSA address field, a pointer to a next NDPSA area as shown in FIG. 6.

It stores in the command fields information which determines whether the NDPSA is a specific Receive Initial NDPSA transferred to the controller extension with a Start Line Initial operation, or whether PIU's are chained to the NDPSA. The specific fields of the Receive Initial NDPSA are shown in FIG. 8 and the specific fields of the PIU-NDPSA are shown in FIG. 9.

If the NDPSA is a PIU-NDPSA, data are chained to this NDPSA through the setting by NCP of a pointer into the data address field. The pointer is the address of a first buffer of a chain of buffers where PIU 1 is stored. The buffers containing each PIU are chained by their prefix. A prefix set to 00 indicates that the buffer is the last buffer of the chain.

A plurality of PIU's, such as PIU 1 and PIU 2, can be chained by an extended control block ECB which points to the first buffer of a next PIU. An ECB field=00 indicates that the PIU is the last PIU chained to the NDPSA. A qualifier in the NDPSA indicates whether an ECB is associated with the NDPSA.

In addition, NDPSA areas can be chained through the next NDPSA address field. A NDPSA address field set to 00 indicates that the NDPSA is the last one of a NPDSA chain.

The transmission of a message or PIU for a specific line is initiated by NCP through a SLI operation for the transmission of a message with NDPSA command fields set to Receive Initial or through a Start Line operation SL in steady state mode. The SL operation is an output IOH operation with the following TA and TD data:

```
TA  11  LIM No     SL
    Coupler Add    operation code
```

-continued

```
TD  ER  Line No
```

A Start Line Initial operation is used for transferring a receive initial NDPSA. As shown in FIG. 8, it comprises a chain pointer to next NDPSA set to 00, a pointer to the first receive buffer in the receive list, the NCP buffer size, a pointer to the first LDPSA and a count of LDPSA used for the flow control as will be described with the receive traffic flow.

The processing of the Start Line Initial operation results in microprocessor 83 reading the NDPSA area, storing the NDPSA into its storage 85 and examining the NDPSA.

Upon determining that this NDPSA is the only one of a chain as indicated by the "chain pointer to next NDPSA" field set to 00, and that this NDPSA is a receive initial NDPSA, the state microprocessor 83 writes the LDPSA address for the line from the "pointer to the first LDPSA" field, the NCP buffer size, the LDPSA count, and the pointer to the first buffer, into table 106 as already described in reference to the initialization process. Then, an NCP to LIM header is placed on the NDPSA, and a message comprising the header indicating that the message is a NCP to LIM message comprising only one NDPSA, and the NDPSA contents is sent to the target LIM through the switch 28. This message allows the LDPSA count to be passed to the target LIM for controlling the LIM to NCP traffic as will be described later on.

```
TA  11  LIM No     SL
    Coupler Add    operation code
TD  ER  Line No
```

The TA and TD data are:

A Start Line operation is processed as follows:

A Start Line operation decoded by state machine 70 is stored in steady state queue 102 in memory 54, to be processed by GPSM 50.

Figure 10:
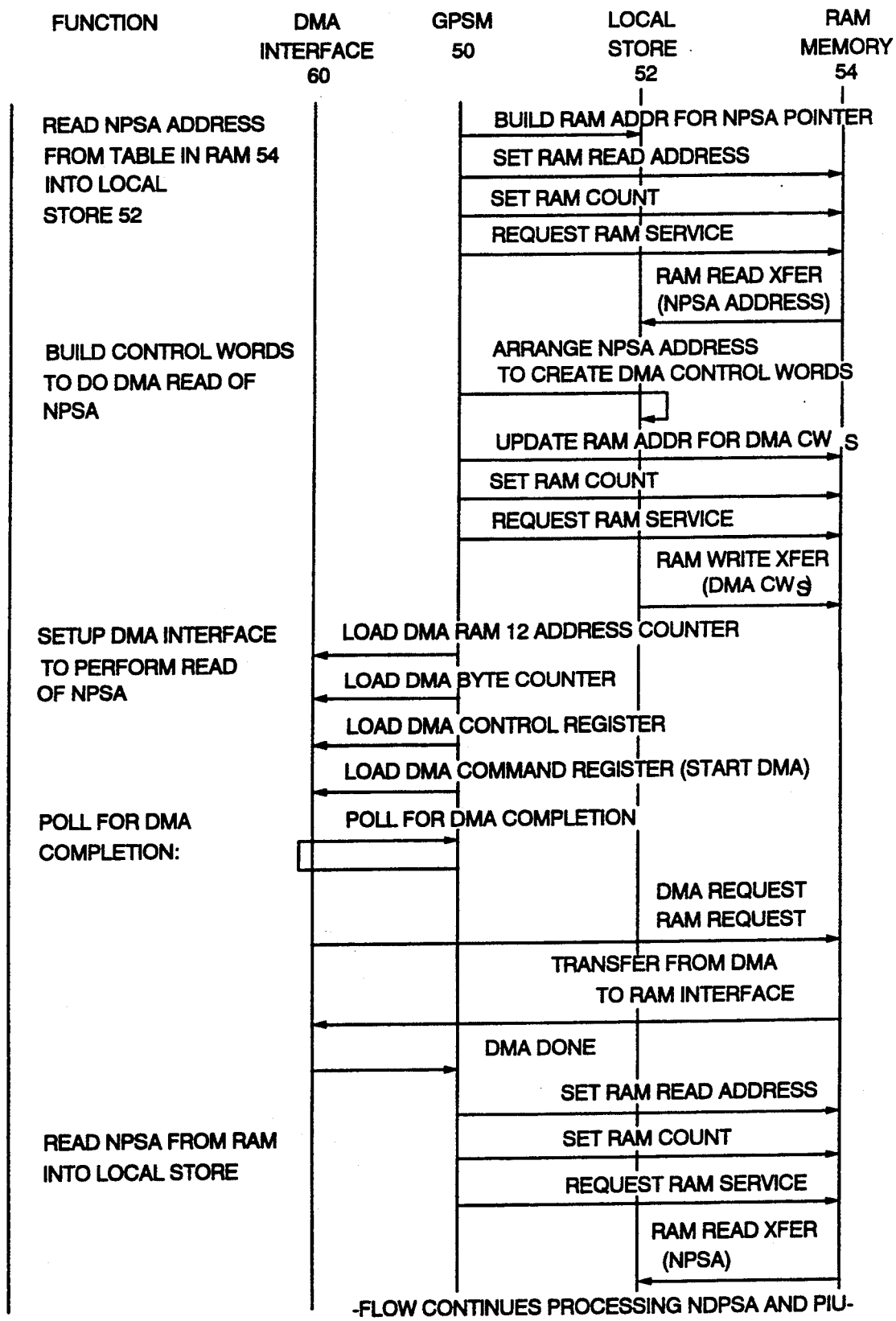
FIG. 10 represents the operations performed by the coupler to read the NPSA, NDPSA's and PIU's for a user.

The process consists of obtaining the NPSA address from table 106 as shown in FIG. 10.

Then GPSM 50 requests a DMA access for reading the NPSA area and storing the NPSA information in local store 52.

GPSM 50 extracts the NDPSA address from the NPSA information and starts a DMA access for reading the NDPSA and storing the NDPSA information in local store 52.

GPSM 50 examines the NDPSA information and if it contains a next NDPSA address field not set to 00, the next NDPSA address from this field is stored in a line control field in line control block queue 104 in memory 54.

Then, the current NDPSA is processed by GPSM 50. It contains the address of the first PIU buffer. A DMA access is started to read the ECB field, if any, and the buffer prefix.

The prefix and ECB are stored in local store 52. The prefix is examined to determine whether another buffer is associated to this PIU. If yes, the buffer address stored in the prefix is loaded in the line control field in line control block queue 104 in memory 54.

The ECB field is examined to determine whether another PIU is associated with this NDPSA. If yes, the address from the ECB field is loaded in the line control field. Once GPSM 50 has finished these checks, GPSM 50 starts a first DMA access to transfer the data contained in the first buffer into memory 54. Then, the next prefix stored in the line control field is checked, as previously described.

The data contained in the second buffer are transferred into memory 54.

The process continues until a prefix equal to 00 is found.

Once the first PIU has been processed, it is sent to the LIM 36 to be routed to the target LIM by the switch 28.

GPSM 50 checks the line control field in control word queue 104 and processes the successive PIU's, if any, by examining the ECB stored in the line control field.

The ECB chain of buffers is processed.

Once the PIU's for the current NDPSA have been processed, the line control field is checked for determining whether a NDPSA is chained thereto. The GPSM 50 systematically unchains NPDPSA and PIU's until a NDPSA pointer is found equal to 00.

Figure 11:
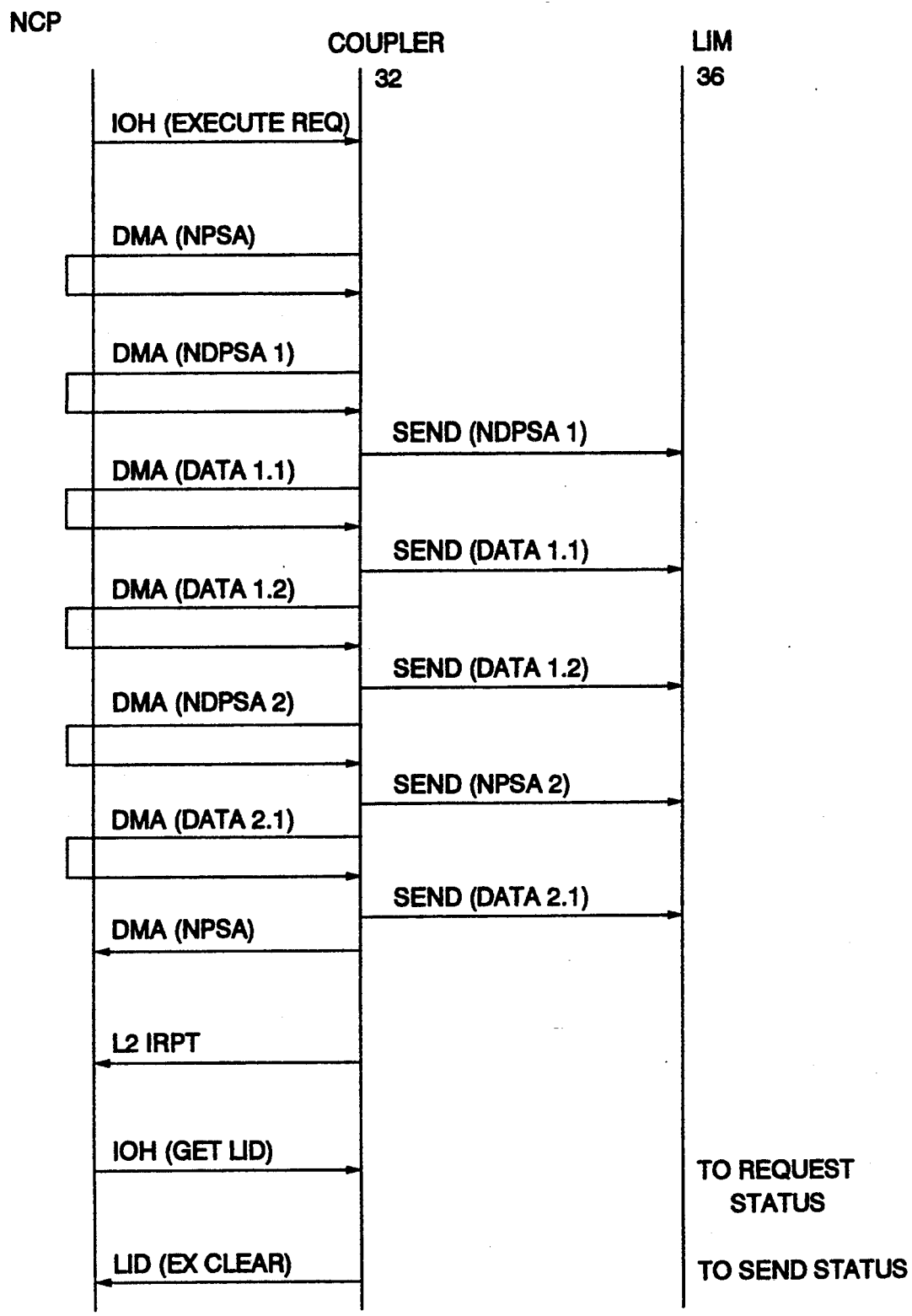
FIG. 11 represents the message exchange through the coupler from the NCP memory to the additional users.

These operations are summarized in FIGS. 10 and 11.

FIG. 10 shows the coupler picocode involvement in NCP to LIM steady state flow for fetching NPSA, NDPSA and PIU's. FIG. 11 shows the message exchange. The process ends by the the coupler writing status information by direct memory access in the NPSA area and requesting an interrupt L2 IRPT to NCP. The interrupt is processed by NCP, which issues a broadcast IOH (input) operation with a GET LINE IDENTIFICATION code operation to be able to determine the origin of the interrupt. This IOH comprises a broadcast address and a GET LINE ID operation code sent at TA time. The coupler which raised the interrupt answers by providing at TD time the line identification EC (execute clear) which is stored in table 106, so that NCP gets the address of the NPSA area from the LNVT table to retrieve the status. In the reverse direction, the coupler 32 is allocated a number of free buffers referenced as the receive list 150, for each line.

Figure 12:
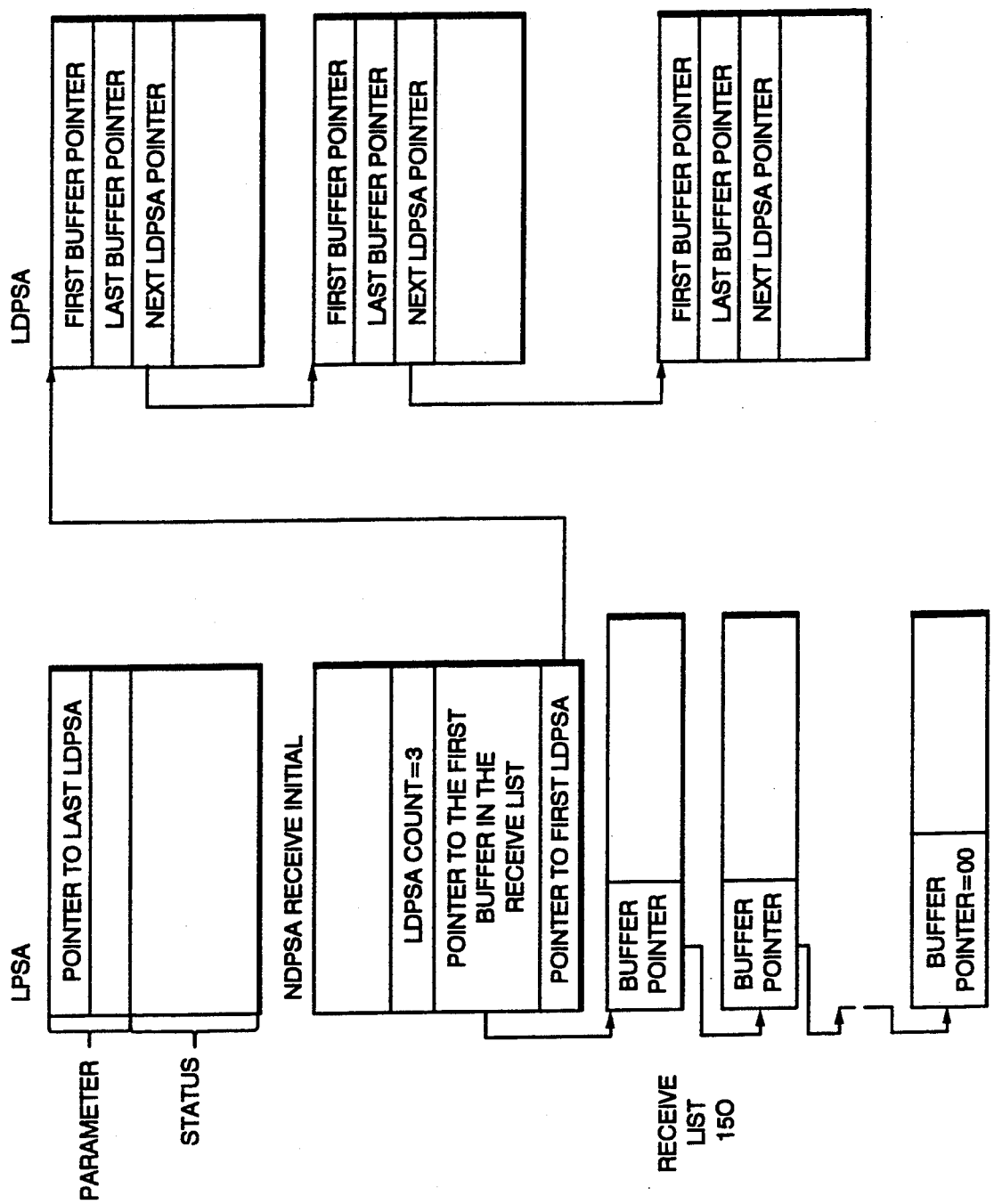
FIG. 12 represents the buffer chaining in the NCP memory 12 for receiving the message from the additional users.

These buffers are chained in NCP memory 12, as shown in FIG. 12, through the next buffer pointer in the buffer prefix field. For each line, the pointer to the first buffer in the receive list is written into table 106 in memory 54 through the Start Line Initial operation.

This pointer is written by NCP in the Receive Initial NDPSA. Also a count of LDPSA is allocated to each line. The pointer to the first LDPSA and the count of LDPSA's are written by NCP in the Receive Initial NDPSA and written in table 106.

The LDPSA's are chained by the next LDPSA pointer field which contains the address of the next LDPSA.

The LDPSA general layout and specific information contained in the LDPSA for the transfers of PIU's are shown in FIGS. 13 and 14.

Of major importance for the present invention, are the two fields "First Data Pointer" and "Second Data Pointer", into which the coupler 32 writes the addresses of the first buffer and last buffer respectively, comprising the data chained to the LDPSA.

Information from the LIM's is received in queues built in the storage 82 of LIM 36 in the form of LDPSA's and LDPSA's concatenated with data. The coupler is notified by the LIM 36 that LIM data are in the memory 82 and manages the required handshaking and controls to retrieve it in bursts of data over the bus 86. Messages from a LIM 34 are composed of one or more bursts of data. Each message is preceded by a header that describes the message. The coupler has to examine the header to determine the tasks to perform on the message.

For a data transfer from a line, the header indicates that the contents of table 106 will be used for controlling the arrangement of data into the NCP memory 12. Information from a LIM is sent to NCP in LDPSA's and associated data. The coupler 32 separates LDPSA in two categories by decoding the command field: namely specific LDPSA without data, and LDPSA-PIU with data. The LDPSA without data are passed unaltered to NCP memory.

The coupler 32 provides the NCP addressing mechanism and builds an LPSA to point to the LDPSA or a chain of LDPSA's containing this LDPSA.

Figure 15:
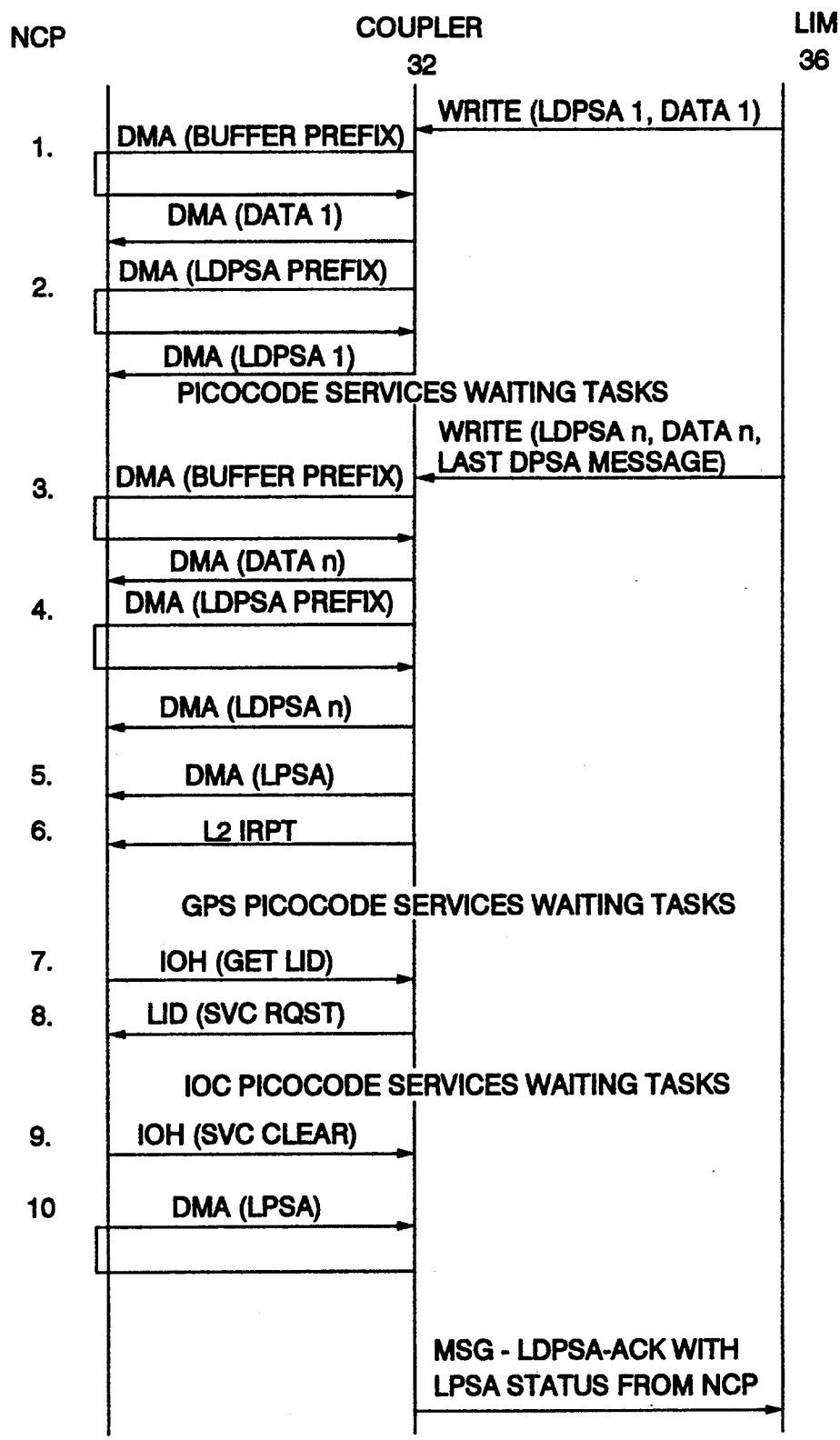
FIG. 15 represents the message exchange through the coupler from the additional users to the NCP memory.

LDPSA's that point to data require more involved handling by the coupler as shown by FIG. 15.

The first LDPSA 1 and concatenated data 1, split into bursts B1-1 to B1-i having the NCP buffer size, coming from a given line of given LIM identified in the local resource identification field of the LDPSA are stored into memory 54 through LIM interface 64 for further processing by the coupler. The LDPSA 1 is transferred to local store 521: GPSM 50 determines the LIM and line No therefrom, and reads the data relative to this line from the table 106 and saves this data.

GPSM 50 starts a DMA access to read the prefix field of the first buffer whose address is read from table 106, and saves this prefix as address of the second buffer, the first burst of data 1 is written in the first buffer. GPSM 50 starts a DMA access to read the prefix field of the second buffer, which is saved as address of the third buffer, the second burst of data 1 is written into the second buffer, and the process continues until all the data bursts of data 1 are stored in the NCP memory.

Then, a DMA access is started by GPSM 50 to read the first LDPSA from NCP memory to get the next LDPSA address to be used for processing the second LDPSA and associated data. LDPSA 1 fields such as the first and second buffer pointer fields are updated with the addresses of the first buffer and last buffer containing the data 1, and the data count of the last buffer and a DMA access is started by GPSM 50 to write the updated LDPSA 1 into NCP memory. The same process is resumed until the last LDPSA shown as LDPSA n in FIG. 15 is reached. The last LDPSA address and status are written in the LPSA area whose address is found in table 106 and an interrupt is raised to NCP.

The interrupt is processed by NCP as follows:

NCP issues an input IOH with a GET LINE ID operation code to determine the originator of the interrupt. In response to this IOH and as described in connection with the NCP to LIM transfer process, the coupler sends at TD time the line identification SR, i.e Service Request. Thus NCP can access the LPSA area and first LDPSA area the address of which is known to NCP, and process the received messages from the LIM and to write a status in the LPSA area. A Service Clear type IOH is sent to the coupler which reads by a DMA access the LPSA to get the status and sends an acknowledgement message to the LIM.

The communication between NCP and all the LIM's 34 is controlled by a flow control mechanism. This mechanism applies on a communication line basis.

For the transport mechanism control flow, NCP defines as described before, at its initialization a pool of NDPSA's and LDPSA's per communication line. The number of NDPSA's is dynamically controlled by NCP and depends on the work load of a given line at that time. NCP is then allowed to send up to this number of NDPSA's to this line in one operation on the input/output bus.

The number of LDPSA's is fixed and is given to the LIM processing the line traffic before the line starts sending data to NCP.

The LIM is responsible for sending up to the NCP-fixed number of LDPSA's per line to NCP via the LIM 36 and coupler 32. This is done by setting an "end of transfer" bit in the header of the message sent by the LIM (34).

Then, the sending LIM buffers the incoming traffic from the network until it receives the acknowledgement message from the coupler 32 which means that a new set of LDPSA for this line may be sent.

We claim:

1. A method for extending the capability of user connections to a communications system, of the type comprising a central control unit running a network control program (NCP) stored in an NCP memory provided with a direct memory access DMA facility through a direct memory access bus, and also comprising an input/output I/O bus by which the central control unit exchanges information with the users connected thereto, through input/output I/O operation (IOH) controlled by the network control program, said method being implemented by the network control program and a coupling means having a unique address, and connected to the I/O bus and DMA bus and to additional users attached to said coupling means comprising the following steps:

for each additional user attached to said coupling means, assigning in the NCP memory a first NCP area (NPSA) including at least a pointer field to a second NCP area (NDPSA) which includes at least a first pointer field to a next second NCP area which can be written by the network control program to a value which indicates whether a next second NCP area is chained thereto or not, and if yes the address of said next second NCP area/and a second pointer field which is written by the network control program to indicate the starting address of a buffer chain into which messages to be transmitted to the corresponding additional user, if any, are stored, issuing initialization I/O operations (SET LNVT, SLI) on the I/O bus specifying the coupling means address, user identification and an indication of the first NCP area address, for providing the addresses of the first NCP area assigned to each additional user to the coupling means, receiving said initialization I/O operations by the coupling means and building by the coupling means a correspondence table including the correspondence between each additional user and the assigned NCP area address, issuing normal mode I/O operations on the I/O bus, for transmitting messages to the additional users, said normal mode operations specifying the coupling means address and additional user identifications, receiving said normal mode I/O operations by the coupling means and reading the corresponding first NCP area addresses which are used by the coupling means for initiating a sequence of DMA accesses to the NCP memory for reading the contents of the first NCP area to get the addresses of the second NCP areas and of the messages chained thereto, if any, and transmitting said second NCP areas and chained messages to the users, for each additional user, assigning in the NCP memory, a first user area (LPSA) the address of which is provided to the coupling means through the initialization I/O operations and written into the correspondence table, for each additional user, providing in the NCP memory a number of second user areas (LDPSA) which are chained through a pointer field written by the network control program to a value indicative of the address of the next second user area or to a value indicative that the next second user area is the last area of the second user area chain, for each additional user, providing in the NCP memory a chain of buffers, with each buffer containing a pointer address field to the next buffer of the chain, writing by the network control program when issuing the initialization I/O operations, a specific first NCP area for each user, including the number of second user areas (LDPSA) assigned to the user, a pointer field set to the starting address value of the second user area chain and a pointer field set to the starting address value of the buffer chain assigned to the additional user, initiating a read direct memory access by the coupling means to the address of the first NCP area computed by the coupling means upon receiving the initialization I/O operations for getting the contents to the second user area which are written into the correspondence table.

2. The method according to claim 1 wherein the step of building said correspondence table by the coupling means comprises the steps of:

computing the first NCP area address assigned to each additional user from the indication of the first NCP area address and user identification received by the coupling means at each initialization I/O operation and writing the computed address for each additional user in the correspondence table.

3. The method according to claim 1 further comprising the steps of:

receiving by the coupling means the messages arranged in second user area (LDPSA) and user data from each additional user, reading the starting address value of the second user area chain and the starting address of the buffer chain from the correspondence table, initiating read direct memory accesses by the coupling means to get the addresses of the next buffers in the buffer chain and next second user areas, initiating write direct memory accesses by the coupling means for writing data into the buffer chain at the successive addresses read from the correspondence table and read from the NCP memory by the read direct memory accesses, initiating write direct memory accesses by the coupling means at successive addresses of the second user areas read from the correspondence table and read from the NCP memory by the read direct memory accesses, for updating the addressed second user areas in the NCP memory with the addresses of the buffers chained thereto.

4. The method according to claim 3 further comprising the steps of:
- providing by the coupling means to the additional user, the number of chained second user areas assigned thereto, so that the additional users send to the coupling means a maximum number of second user areas equal to said assigned number,
- providing by the coupling means an acknowledgement to the additional users when their assigned numbers of second user areas and chained data have been processed by the network control program, so that they can provide a new set of second user areas with chained data.

5. A coupling device for extending the capability of user connections to a communication system of the type comprising a central control unit running a network control program (NCP) stored in an NCP memory, provided with a direct memory access DMA facility through a direct memory access bus and also comprising an input/output I/O Bus by which the central control unit exchanges information with the users connected thereto through input/output I/O operations (IOH), controlled by the network control program, said coupling device being connected to the I/O bus and DMA bus and to additional users, and comprising:
- interface means connected to the input/output bus for receiving the information provided on the I/O bus through I/O operations addressed to the coupling device said I/O operations being of the initialization type and of the normal mode type, the initialization I/O operations (SET LNVT, SLI), which are issued by the network control program for each additional user specifying the coupling device address, the operation type, user identification, and an indication of the address of a first NCP areas assigned in the NCP memory to each additional user, said first NCP area (NPSA) including at least a pointer field to a second NCP area (NDPSA) which includes at least a first pointer field to a next second NCP area, which can be written by the network control program to a value which indicates whether a next second NCP area is chained thereto or not, and if yes the address of the next second NCP area and a second pointer field which is written by the network control program to indicate the starting address of a buffer chain into which the messages to be transmitted to the corresponding additional user, if any, are stored, and the normal mode I/O operations which are issued by the network control program for transmitting messages to the additional users, and specifying the coupling device address, the operation type, and the user identifications,
- wherein each additional user has assigned in the NCP memory a first user area (LPSA), a number of second user areas (LDPSA) which are chained through a pointer field written by the network control program to a value indicative of the address of the next second user area or to a value indicative that the next second user area is the last area of the second user area chain, and a chain of buffers, with each buffer containing a pointer address field to the next buffer of the chain,
- storing means,
- first processing means activated when the interface means receive initialization I/O operations for computing the address of first NCP areas assigned to the additional users and building a correspondence table in the storing means including the correspondence between each additional user and the assigned NCP area address, first processing means includes means for initiating read direct memory accesses to the NCP memory at the addresses of the first NCP areas, for:
  - reading the addresses of specific second NCP areas chained thereto, and written at initialization by the network control program with the number of second users areas (LDPSA) assigned to the user, a pointer field set to the starting address value of a user area chain and a pointer field set to the starting address value of the buffer chain assigned to the additional user,
  - and reading the specific second NCP areas and writing the number of second user areas (LDPSA) assigned to each additional user, the starting address value of each user area chain and the starting address value of each user buffer chain into the correspondence table,
- second processing means activated when the interface means receive normal mode I/O operations for reading the corresponding first NCP area address form the correspondence table and initiating a sequence of DMA accesses to the NCP memory for reading the first NCP area dynamically to get the addresses of the second NCP areas and of the messages chained thereto, if any, and transmitting said second NCP areas and chained messages to the additional users,
- means for receiving the messages arranged in second user areas (LDPSA) and user data from each additional user,
- means for reading the starting address value of the second user area chain and the starting address of the buffer chain from the correspondence table,
- means for initiating read direct memory accesses at the starting addresses of the buffer chain and second user area chain to get the addresses of the next buffer address and next second user area, and
- means for initiating write direct memory accesses for writing the received data into the buffer chain at successive addresses read from the correspondence table and read from the NCP memory by the read direct memory accesses and for initiating write direct memory accesses at successive addresses of the second user areas read from the correspondence table and read from the NCP memory by the read direct memory accesses, for updating the addressed second user areas into the NCP memory with the addresses of the buffers chained thereto.

* * * * *